(No Model.)

A. SPENCER.
INDIA RUBBER BUFFER AND BEARING SPRING

No. 546,359. Patented Sept. 17, 1895.

Witnesses.
Henry Bishop
Charles Ernest Brougham.

Inventor:
Alexander Spencer.

UNITED STATES PATENT OFFICE.

ALEXANDER SPENCER, OF LONDON, ENGLAND.

INDIA-RUBBER BUFFER AND BEARING SPRING.

SPECIFICATION forming part of Letters Patent No. 546,359, dated September 17, 1895.

Application filed April 18, 1895. Serial No. 546,196. (No model.) Patented in England July 26, 1889, No. 11,921.

*To all whom it may concern:*

Be it known that I, ALEXANDER SPENCER, a subject of the Queen of Great Britain and Ireland, residing at Cannon Street, in the city of London, England, have invented Improvements in India-Rubber Buffer Draw and Bearing Springs, (for which I have obtained Letters Patent in England, No. 11,921, dated July 26, 1889,) of which the following is a specification.

My invention has reference to improvements in springs, such as referred to in the specification of an application for Letters Patent of the United States by Alfred George Spencer, filed July 31, 1894, Serial No. 519,051, and which said springs are constructed with india-rubber and metallic plates and provided with supplementary elastic parts arranged in relation to the said plates in such a manner as to relieve shocks in the event of full compression occurring suddenly, so that by means of the supplementary springs the contact of cup or dividing plates with one another is prevented.

According to my invention, instead of constructing a spring with perforated cupped or other plates formed with nozzles and embedded by molding in the india-rubber, I make my improved spring with a compound ring consisting of two cup-rings made without nozzles and arranged back to back with an india-rubber ring molded in between them, this compound ring being made separate from and being forced into place upon an india-rubber body formed with a groove to receive and retain the said compound ring in its proper place on the said body, and in like manner I make a compound nozzle consisting of two metal rings with an india-rubber ring adapted to serve as a supplementary spring molded in between them after the same manner as that molded in between the cup-rings, the india-rubber body and the compound nozzle being so formed that when the compound nozzle is forced into place within the hole in the india-rubber body the compound nozzle will be retained there.

In order that others skilled in the art may be enabled to make and use my said invention, I will now describe the same in detail by reference to the accompanying illustrative drawings.

Figure 1:
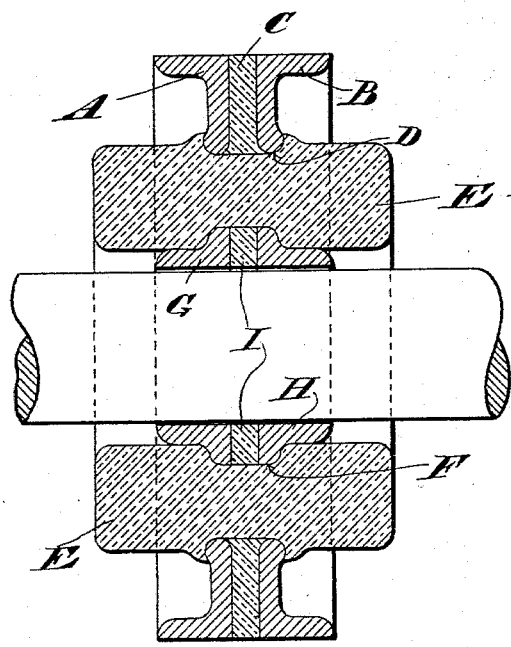
Figure 2:
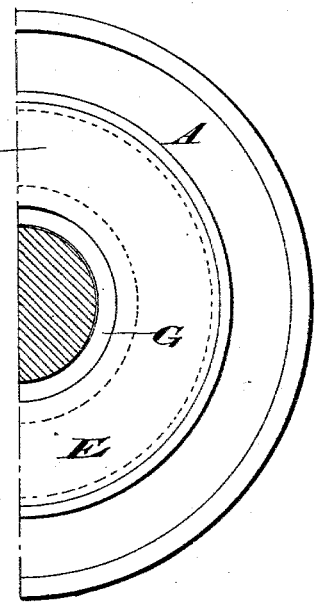

In the drawings, Figure 1 shows in central longitudinal section a spring according to my invention. Fig. 2 shows a half end view of same.

As will be here seen, I form a compound ring consisting of two cup-rings A and B, made without nozzles and arranged back to back with an india-rubber ring C (hereinafter called the "supplementary spring") molded in between them. A groove is molded at D in the periphery of the india-rubber body E, which may have the form of a cylinder or that of a double cone, and the compound cup-ring is forced into the said groove, as it is shown in Fig. 1.

At F a groove is molded in the hole of the india-rubber body E, into which, after the spring is vulcanized, there is forced the compound nozzle formed of two metal rings G H, with an india-rubber ring I to serve as a supplementary spring molded in between them. This compound nozzle is shown the same width as the compound cup-ring, because I consider it advantageous to make it so; but the nozzle may in some cases be made in one piece and of less width than the cup-ring, or the nozzle may be dispensed with, in which case the hole in the india-rubber body would be made of the same diameter as is the hole through the nozzle when a nozzle is used.

With springs having compound rings according to my invention, in the event of full compression occurring and consequent contact of other plates with the cup-rings, there will be a reserve of elasticity to counteract or take up the consequent shock or shocks after the manner set forth with reference to the constructions of buffer and other springs described in the specification of the before-mentioned patent application of Alfred George Spencer.

What I claim is—

1. A buffer draw or bearing spring constructed with an india rubber body having a hole therethrough and with a compound ring comprising two cup rings made without nozzles and arranged back to back with an india rubber ring molded in between them, this compound ring being made separate from and being forced into place upon said india rubber body and said body being formed with a groove to receive and retain said compound ring in its proper place on said body, as herein above described.

2. A buffer draw or bearing spring constructed with an india rubber body having a hole therethrough and with a compound nozzle comprising two metal rings with an india rubber ring to serve as a supplementary spring molded in between them, said compound nozzle being forced into its proper place in said hole and said hole and said compound nozzle being formed the one with a groove the other with a bead adapted to enter said groove and keep said compound nozzle in place as described.

3. A draw buffer or bearing spring comprising an india rubber body having a hole through it, a groove around its exterior, a groove within said hole, two cup rings made without nozzles and arranged back to back with an india rubber ring molded in between them, thus forming a compound ring which is forced into said exterior groove, and a compound nozzle comprising two metal rings with an india rubber ring to serve as a supplementary spring molded in between them, said compound nozzle being forced into its proper place in said hole, and said hole and said compound nozzle being formed the one with a groove the other with a bead adapted to enter said groove and keep said compound nozzle in place as described.

In testimony whereof I have signed my name to this specification in the presence of two subscribing witnesses.

ALEXANDER SPENCER.

Witnesses:
PERCY E. MATTOCKS,
WM. V. BROWN.